United States Patent [19]

Sato et al.

[11] 4,297,843

[45] Nov. 3, 1981

[54] COMBUSTOR OF GAS TURBINE WITH FEATURES FOR VIBRATION REDUCTION AND INCREASED COOLING

[75] Inventors: Isao Sato; Fumio Kato; Yoshihiro Uchiyama; Nobuyuki Iizuka; Tsuneyuki Hata, all of Hitachi, Japan

[73] Assignee: Hitachi, Ltd., Tokyo, Japan

[21] Appl. No.: 84,438

[22] Filed: Oct. 12, 1979

[30] Foreign Application Priority Data

Oct. 16, 1978 [JP] Japan ............................... 53-126192

[51] Int. Cl.[3] ............................................... F02C 7/18

[52] U.S. Cl. ................................. 60/39.32; 60/39.37; 60/752

[58] Field of Search ...................... 60/39.37, 752, 39.32

[56] References Cited

U.S. PATENT DOCUMENTS

| | | | |
|---|---|---|---|
| 2,743,579 | 5/1956 | Gaubatz | 60/39.37 |
| 3,657,882 | 4/1972 | Hugoson | 60/39.37 |

*Primary Examiner*—Robert E. Garrett

*Attorney, Agent, or Firm*—Craig and Antonelli

[57] ABSTRACT

A combustor of a gas turbine having a plurality of liners defining combustion chambers, and transition pieces adapted to rectify the flow of the combustion gas discharged from the liners before the combustion gas is introduced to the turbine. A guide plate is disposed in the gap between each pair of adjacent transition pieces near the gas outlets of the latter so as to guide the flow of air to the radially outer surfaces of adjacent transition pieces, thereby to improve the cooling of these surfaces and, at the same time, to mechanically connect the adjacent transition pieces to suppress the vibration of the transition pieces.

7 Claims, 4 Drawing Figures

COMBUSTOR OF GAS TURBINE WITH FEATURES FOR VIBRATION REDUCTION AND INCREASED COOLING

BACKGROUND OF THE INVENTION

The present invention relates to a combustor of a gas turbine and, more particularly, to a combustor of a gasturbine which can effectively withstand the vibration and thermal distortion generated during the combustion.

It is a current measure for preventing the pollution of air attributable particularly to lower nitrogen oxide (NOx) content to effect a spray of water, steam or the like into the combustors of gas turbines. This spray lowers the temperature of the combustion gas to effectively suppress the production of NOx in the combustor. On the other hand, however, the lowered temperature of the combustion gas considerably hinders the combustion of the fuel in the combustor. More specifically, the pulsation of the combustion is enhanced due to the lowered combustibility, resulting in a cyclically repeated application of load. This repetitional load is concentrated to the thermally weak portions of the combustor to cause a break down due to a stress concentration.

Generally, in the gas turbines for industrial purposes, compressed air produced by an air compressor is introduced into a combustor where the compressed air is mixed with the fuel and the mixture is burnt to form a combustion gas. This combustion gas is introduced to drive the turbine which in turn drives a load connected thereto. The combustor is mainly constituted by a liner forming a combustion chamber, a transition piece connected to the liner, an outer casing surrounding the liner and the transition piece and a fuel nozzle attached to the outer casing.

The fuel atomized into a liner from the fuel nozzle is burnt under the presence of the air which has been compressed by the air compressor and introduced into the liner through the jacket defined between the outer casing and the combined body of the liner and the transition piece and then through the combustion air port formed in the wall of the liner. The combustion gas produced as the result of the combustion then flows through the liner and introduced into the gas turbine after a rectification performed by the transition piece.

The transition piece is partially cooled by the compression air which flows toward the liner defining the combustion chamber. However, the transition piece has some portions which are in locations relatively inaccessible to the cooling air flow and, hence, the cooling is rather difficult. More specifically, this portion is the radially outer part of the gas outlet of the transition piece closest to the gas turbine. In consequence, this portion of the transition piece is heated excessively and broken due to the stress concentration.

The liner and the transition piece are supported for free thermal expansion and shrinkage. In other words, they are supported rather loosely. Therefore, the vibration caused by the pulsating combustion is transmitted from the liner to the transition piece to generate a vibration of a considerably large amplitude in the transition piece, particularly at the gas outlet side of the latter.

SUMMARY OF THE INVENTION

It is, therefore, an object of the invention to provide an improved construction which permits, in the gas turbine combustor, an efficient cooling of the portion of the transition piece which is relatively inaccessible to the cooling air flow.

It is another object of the invention to provide an improved construction capable of suppressing the vibration of transition piece of the gas turbine combustor.

To these ends, according to the invention, there is provided a combustor of a gas turbine having a plurality of combustor liners, transition pieces connected to respective liners and adapted to rectify the flow of the combustion gas and outer casings enclosing the liners and the transition pieces, wherein the improvement comprises at least one guide plate disposed between adjacent transition pieces and adapted to rectify the flow of air passing through the clearances between adjacent transition pieces.

According to another aspect of the invention, there is provided a gas turbine combustor having the above stated features, wherein the guide plates are disposed in the vicinity of the gas outlets of the transition pieces.

These and other objects, as well as advantageous features of the invention will become more clear from the following description of the preferred embodiments taken in conjunction with the accompanying drawings.

DESCRIPTION OF THE PREFERRED EMBODIMENT

Figure 1:
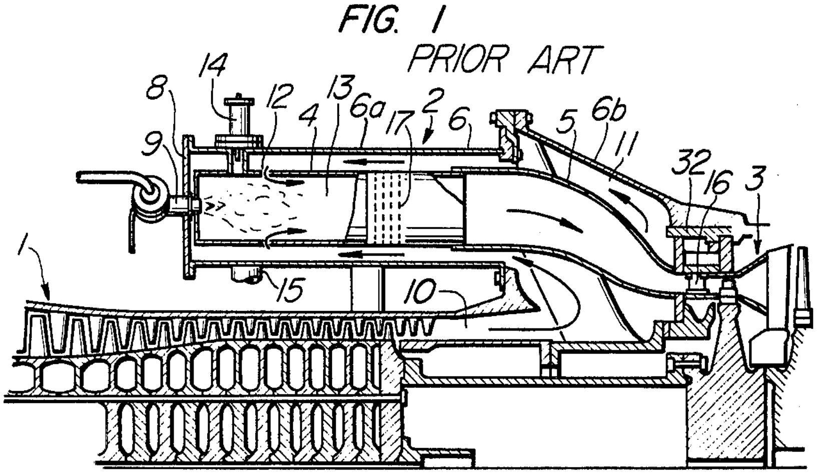
FIG. 1 PRIOR ART
FIG. 1 is a sectional view of a part of a conventional gas turbine engine, showing a typical arrangement of the combustor.

Referring first to FIG. 1 which is a sectional view of a part of a conventional gas turbine engine, reference numerals 1, 2 and 3 denote, respectively, an air compressor, a combustor and a turbine. The combustor 2 is constituted mainly by a plurality of (e.g. 10) liners 4 equispaced in the circumferential direction of the turbine engine, transition pieces 5 connected to the rear ends of respective inner cylinders, outer casings surrounding the inner cylinders and the transition pieces, each outer casing having a cylindrical portion *6a* coaxial with corresponding liner 4 and an annular housing *6b* to which the rear end of the cylindrical portion *6a* is attached, and fuel nozzles 9 attached to the side covers 8 of respective outer casings.

The air compressed by the air compressor 1 is introduced through the outlet 10 of the latter into jackets 11 defined in respective outer casings 6 and makes a turn in the annular housing *6b*. The air then flows as indicated by arrows to the inside 13 of each liner through combustion air ports 12 formed in the wall of the liner 4.

Meanwhile, the fuel atomized into the inside of each liner 4 from the associated fuel nozzle 9 is ignited for starting the engine by an ignition plug 14 which is usually provided in one or two of the plurality of liners 4, and is burnt under the presence of the combustion air supplied through the combustion air ports 12. The fuel in the liners which are not provided with the ignition plug is ignited by the flame propagated through cross fire tube 15 which connects the adjacent liners. Once the ignition is made in all liners, the combustion is maintained continuously, and the combustion gas of high temperature flows through the liner 4 and is introduced to the first nozzle of first stage of the gas turbine, after a rectification performed by the transition piece. The gas then is effective in the turbine 3 to thereby drive a load such as a generator (not shown) coupled to the turbine. During the operation of the turbine, the inner surface of each liner 4 is film-cooled by the air which is introduced into the liner through a multiplicity of louver ports 17 formed in the liner, so that the inner surfaces of the liner is not so hot and is maintained at a comparatively low temperature of 600° to 700° C. In contrast to the above, the film cooling is not effected on the transition piece because the latter has no louver ports. In consequence, the wall of the transition piece is heated up to a high temperature which may reach 800°-850° C. or higher. In FIG. 1, a turbine casing is designated at a reference numeral 32.

Figure 2:
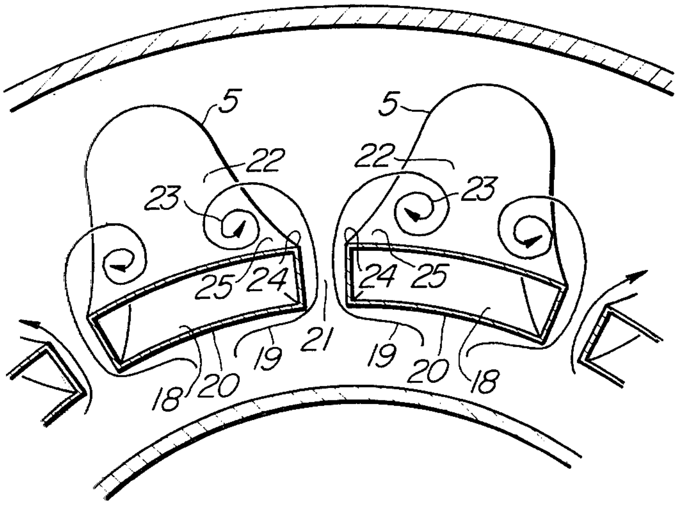
FIG. 2 PRIOR ART
FIG. 2 is a schematic illustration of the gas outlet of a transition piece of the gas turbine combustor shown in FIG. 1, as viewed from the side closer to the turbine.

The reason why the wall of the transition piece is heated to the high temperature will be described in more detail with specific reference to FIG. 2. FIG. 2 schematically shows the gas outlets of some of the transition pieces as viewed from the side closer to the first nozzle 16 of the gas turbine. The combustion gas coming from a plurality of liners is introduced to the nozzle 16 of the first stage of the gas turbine, through the gas outlets 18 of respective transition pieces. On the other hand, the flow 19 of the compressed air outside of the gas outlet 18 collides with the lower surface of each transition piece, i.e. the radially inner surface 20 of the same and then flows through the gaps 21 between adjacent transition pieces 5. In consequence, eddy currents 23 of air are generated on the upper surface, i.e. the radially outer surface 22 of each transition piece. Simultaneously, dead air regions 25 are formed at the corners 24 of the radially outer surface 22 of each transition piece. The central portion of the radially outer surface 22 is maintained at a comparatively low temperature thanks to a large cooling effect provided by the turbulent flow of the air generated by the eddy currents 23, whereas the corners 24 on which the dead air regions 25 are formed are heated to a very high temperature which is, for example, about 850° C. In consequence, the stress is concentrated to the corners 24 of the radially outer surface 22 of each transition piece, resulting in a break down of the transition piece at these corners.

As stated before, the invention aims at providing a combustor of a gas turbine, capable of overcoming the above-described problems of the prior art.

To this end, according to the invention, guide plates for rectifying the flow of air are disposed in the gaps between adjacent transition pieces.

Figure 3:
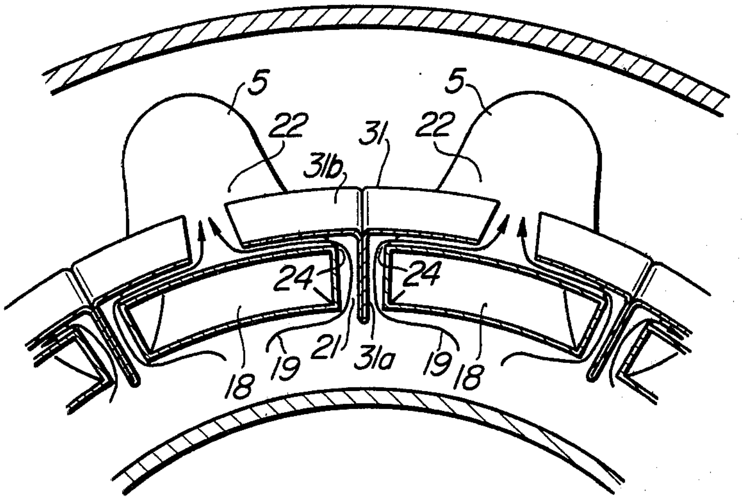
FIG. 3 is a schematic illustration of the gas outlet of a transition piece of a gas turbine combustor constructed in accordance with the invention, as viewed from the side closer to the turbine.
Figure 4:
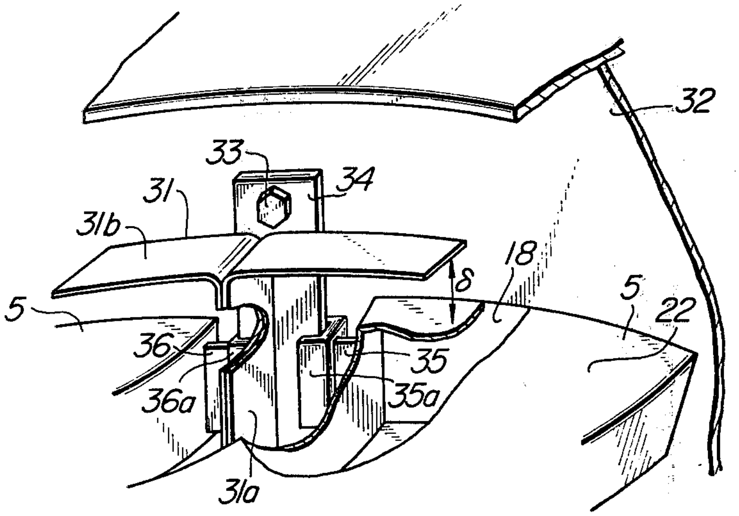
FIG. 4 is a perspective view showing the construction for mounting guide plates shown in FIG. 3.

Hereinafter, an embodiment of the gas turbine combustor of the invention will be described with specific reference to FIGS. 3 and 4. In these Figures, reference numerals 5 and 18 denote, respectively, transition pieces and gas outlets of these transition pieces. A T-shaped guide plate 31 is disposed in the gap 21 between each pair of adjacent transition pieces 5. The radial portion **31*a* of the guide plate 31 is disposed at the intermediate portion of the gap 21 so as to divide the latter into two sections, while the circumferential portion 31*b* is disposed to overlie the upper corners 24 of each transition piece 5 at a suitable clearance δ from the upper surface of the transition piece 5. This guide plate 31 is welded to a base plate 34 which in turn is fixed to the turbine casing 32 by means of bolts 33, and is received at its both side edge portions by the innersurface of the U-shaped channel section 35*a*, 36*a* of support members 35 and 36 which are welded to the wall of the gas outlets of the adjacent transition pieces 5. Therefore, the guide plate 31 connects the adjacent transition pieces 5 to each other. In the illustrated embodiment, the guide plate 31** is formed by folding a web member at the center and then opening both free ends to provide the T-shaped cross-section.

In operation of the gas turbine having the combustor of the invention, the flow 19 of compressed air flowing through each gap 21 between each pair of adjacent transition pieces 5 is rectified to flow along the surface of the guide plate. More specifically, the compressed air flows in the gap 21 along the radial portion **31*a* of the guide plate 31 and then on the radially outer surface 22 of the transition piece so as to cover the latter, along the circumferential portion 31*b*** of the guide plate.

As a result, the compressed air flows smoothly on the entire area of the radially outer surface 22 of the transition piece including the corners 24 without forming the dead air regions which are inevitably formed in the conventional combustor, so that the cooling effect on the entire area of the radially outer surface is increased to avoid the local temperature rise.

In consequence, the stress concentration to the corners 24 attributable to the generation of dead air regions is eliminated completely. In addition, since the guide plate 31 connects the adjacent transition pieces 5 to each other, the sliding of the transition pieces due to the thermal distortion, as well as the vibration of the same, is effectively suppressed.

An optimum cooling effect will be obtained by suitably adjusting the clearance δ between the radially outer surface 22 of the transition piece 5 and the circumferential portion **31*b* of the guide plate through changing the position of the latter. The position of the guide plate 31 can be changed by changing the positions of bolts 33 of the base plate 34**.

Also, it is possible to rectify the air flow more smoothly, if the transient portion between the radial and circumferential portions **31*a*, 31*b*** is suitably curved.

From the foregoing description, it will be apparent that various advantages are brought about by the invention.

Firstly, it is possible to obviate the stress concentration to the corners of radially outer surface of the transition piece, thanks to a uniform and efficient cooling of that surface.

Secondly, the guide plate which connects the adjacent transition pieces to each other is effective to suppress the sliding of these pieces caused by the thermal distortion, as well as the undesirable vibration of these pieces attributable to the vibratory combustion taking place in the liners.

What is claimed is:

1. A combustor of a gas turbine having a plurality of combustor liners, a plurality of transition pieces connected to respective liners and adapted to rectify the flow of combustion gas coming from said liners, and a plurality of outer casings surrounding respective combinations of said liners and said transition pieces, comprising a guide plate having a radial portion disposed in each gap formed between each pair of adjacent transition pieces, said guide plate being adapted to rectify the air flowing through said gap, each guide plate having circumferential members that overlie the transition pieces and are attached to the radial portion of the guide plate, and said circumferential members form a gap between the adjacent circumferential members for exit of the cooling air.

2. A combustor of a gas turbine as claimed in claim 1, wherein each of said guide plates is disposed in the vicinity of the gas outlet of each transition piece.

3. A combustor of a gas turbine as claimed in claim 1 or 2, wherein each of said guide plates is connected to both of said transition pieces between which said guide plate is located.

4. A combustor of a gas turbine as claimed in claim 2, wherein radial portions of each of said guide plates are disposed in said gap near the gas outlets of adjacent transition pieces and circumferential portions of each of said guide plates extend circumferentially from the radially outer end of said radial portion to overlie the corners of the radially outer surfaces of gas outlets of adjacent transition pieces.

5. A combustor of gas turbine as claimed in claim 2, wherein each of said guide plates includes a base plate attached to a turbine casing of said gas turbine, and support members fixed to the side walls of said gas outlets of the adjacent transition pieces, each of said support members having a U-shaped channel section for receiving corresponding side edge portion of said base plate.

6. A combustor of a gas turbine as claimed in claim 4, wherein the clearance between said circumferential portion of said guide plate and said radially outer surface of said gas outlet of said transition piece is adjustable to provide the optimum cooling effect.

7. A combustor of a gas turbine as claimed in claim 5, wherein the state of fit of said U-shaped channel sections base plate in said of said support members is so selected as to permit the thermal expansion and shrinkage of said transition pieces but to suppress the vibration of said transition pieces.

* * * * *